(12) United States Patent
Schwind et al.

(10) Patent No.: US 8,426,497 B2
(45) Date of Patent: Apr. 23, 2013

(54) SYNTHESIS OF IMPROVED BINDERS AND MODIFIED TACTICITY

(75) Inventors: Helmut Schwind, Hanau (DE);
Uwe-Martin Wiesler, Darmstadt (DE);
Cornelia Borgmann, Frankfurt (DE);
Heike Leuninger, Mainz (DE); Thomas Schmied, Luetzelbach (DE); Stefanie Maus, Frankfurt (DE); Werner Friedrich, Rodenbach (DE); Sven Balk, Frankfurt (DE)

(73) Assignee: Evonik Roehm GmbH, Darmstadt (DE)

( * ) Notice: Subject to any disclaimer, the term of this patent is extended or adjusted under 35 U.S.C. 154(b) by 230 days.

(21) Appl. No.: 12/864,363

(22) PCT Filed: Feb. 2, 2009

(86) PCT No.: PCT/EP2009/051117
§ 371 (c)(1),
(2), (4) Date: Jul. 23, 2010

(87) PCT Pub. No.: WO2009/121640
PCT Pub. Date: Oct. 8, 2009

(65) Prior Publication Data
US 2010/0298466 A1    Nov. 25, 2010

(30) Foreign Application Priority Data

Apr. 1, 2008  (DE) .......................... 10 2008 000 914

(51) Int. Cl.
*F21V 5/29*  (2006.01)
(52) U.S. Cl.
USPC .......................................... 523/172; 523/348

(58) Field of Classification Search .................. 523/172, 523/348
See application file for complete search history.

(56) References Cited

U.S. PATENT DOCUMENTS

| 4,529,787 A | 7/1985 | Schmidt et al. |
| 2003/0134949 A1* | 7/2003 | Brown .......................... 524/261 |
| 2005/0159565 A1 | 7/2005 | Jung et al. |

FOREIGN PATENT DOCUMENTS

| EP | 0 096 901 | 12/1983 |
| WO | 98 12229 | 3/1998 |
| WO | 99 23119 | 5/1999 |
| WO | 03 031056 | 4/2003 |
| WO | 2007 087465 | 8/2007 |

OTHER PUBLICATIONS

U.S. Appl. No. 13/142,508, filed Jun. 28, 2011, Schwind, et al.
U.S. Appl. No. 13/393,390, filed Feb. 29, 2012, Poppe, et al.

* cited by examiner

*Primary Examiner* — Edward Cain
(74) *Attorney, Agent, or Firm* — Oblon, Spivak, McClelland, Maier & Neustadt, L.L.P.

(57) ABSTRACT

The invention relates to a process for preparing polymers for coating applications by polymerizing esters of acrylic acid or of methacrylic acid or vinyl aromatics or other free-radically polymerizable vinyl compounds or monomer mixtures composed predominantly of such monomers by means of a continuous polymerization process. In particular, the invention relates to a solvent-free preparation process for polymers, through which the binder can be prepared for coating applications with superior processing properties, very good thermal stability, improved pigment wetting and a higher gloss.

17 Claims, No Drawings

SYNTHESIS OF IMPROVED BINDERS AND MODIFIED TACTICITY

CROSS REFERENCE TO RELATED APPLICATION

This application is a 371 of PCT/EP09/051,117, filed on Feb. 2, 2009, and claims priority to German Patent Application No. 10 2008 000914.8, filed on Apr. 1, 2008.

FIELD OF THE INVENTION

The invention relates to a process for preparing polymers for coating applications by polymerizing esters of acrylic acid or of methacrylic acid or vinyl aromatics or other free-radically polymerizable vinyl compounds or monomer mixtures composed predominantly of such monomers by means of a continuous polymerization process. In particular, the invention relates to a solvent-free preparation process for polymers, through which the binder can be prepared for coating applications with superior processing properties, very good thermal stability, improved pigment wetting and a higher gloss.

PRIOR ART (Meth)acrylate or vinyl aromatic binders for coating applications are generally prepared in the art by means of suspension polymerization or solution polymerization. By (meth) acrylates are meant not only acrylic acid and its derivatives, its esters for example, but also methacrylic acid and its derivatives, its esters for example, and mixtures of the aforementioned components.

The present invention, in contrast, describes a bulk polymerization process and, with particular preference, a continuous bulk polymerization process. Such a process can be carried out without disruptive solvents. In the course of a polymerization, of (meth)acrylates, for example, solvents may bring about secondary reactions such as chain transfer reactions, unwanted termination reactions, or even polymer-analogous reactions. In addition, the handling of solvents under production conditions poses a safety risk. Furthermore, the choice of the solvent may also be restricted by the production process—by the required reaction temperature, for example. This in turn adversely affects the subsequent formulation and the application form—in respect, for example, of excessively long drying times as a result of a solvent whose boiling point is too high. The free choice of solvent is further restricted if the intention is to modify the microstructure of the polymer by means of precise setting of the reaction temperature. Moreover, the skilled person is aware that the polymerization of (meth)acrylates or vinyl aromatics at high temperatures leads to a higher fraction of what are referred to as head-to-head linkages. Bonds of this kind in a polymer chain significantly reduce the thermal stability of the polymer and may lead to a higher residual monomer content, among other consequences.

An alternative removal of the solvent used for the production necessitates an additional, unwanted production step and also, through the use of two different solvents for preparation and application, imposes a burden on the environment.

The suspension polymerization of esters of acrylic acid or of methacrylic acid or of vinyl aromatics or of monomer mixtures, composed predominantly of such monomers is known in principle. This process as well is carried out in solvent-free form. As compared with bulk polymerization, however, this process has the great disadvantage that a large amount of water is used. This necessitates additional operating steps such as a filtration and a subsequent drying. This drying is usually incomplete. In coating applications, however, even low levels of residual water lead to a distinct deterioration in the optical properties such as, for example, the gloss or the dispersing of pigment.

Moreover, a suspension polymerization cannot be carried out continuously, but instead can be carried out only in batch operation. Such a process is less flexible and efficient to carry out than a continuous polymerization.

Another disadvantage of suspension polymerization in relation to other polymerization processes is the large number of auxiliaries such as dispersants, emulsifiers, antifoam agents or other auxiliaries that must be employed and that are also still present in the end product after work-up. As contaminants, these auxiliaries in a coating may result, for example, in reduced gloss levels, impaired dispersion of pigments or gel specks as a result of insufficiently washed-out dispersants which are insoluble in organic solvents.

Another disadvantage is the highly restricted copolymerizability of polar comonomers such as (meth)acrylic acids, and amino-functional or hydroxy-functional (meth)acrylates. The fraction of these monomers as a proportion of the respective monomer mixture must be limited severely, on account of their water solubility.

Another great disadvantage of suspension polymerization is the reaction temperature required. A process of this kind can be carried out only within a very small temperature window. Owing to the water used, it is fundamentally very difficult to set temperatures above 100° C. Theoretical implementation under pressure and at temperatures above 100° C. is inadvisable, owing to the further improvement under such conditions of the solubility of the monomers in the water phase. At temperatures that are excessively low, in contrast, the suspension polymerization is very slow and/or incomplete, and the setting of a particle size compatible with the operation is extremely difficult. An example of the preparation of suspension polymers as binders for coating applications is found in DE 0 190 433.

A further disadvantage of suspension polymerization in relation to bulk polymerization is the energy balance: the heating of an approximately 50% water phase and the required cooling of this water phase after the polymerization consume energy and time.

Non-continuous bulk polymerization in stirred tanks or vessels leads in principle only to incomplete reactions of the monomers and hence to high residual monomer fractions, which in turn disrupt the coat-film properties or must be removed, in a costly and inconvenient operation, before the formulation stage.

The skilled person is aware of a large number of different continuous bulk polymerization methods for the preparation of poly(meth)acrylates. EP 0 096 901, for example, describes the continuous feeding of a stirred tank with a monomer mixture composed of styrene, α-methylstyrene and acrylic acid, and the simultaneous removal of the polymer. By way of reaction temperatures a range between 170° C. and 300° C. is described, without any influencing of the polymer microstructure by the conditions or any distinction of the performance properties.

Great importance for the implementation of continuous bulk polymerization is now possessed by tube reactors. WO 98 04593 describes the continuous preparation of acrylate resins or of copolymers of styrene, α-methylstyrene and acrylic acid. The polymerization is carried out at a temperature between 180° C. and 260° C. The preparation of polymers of analogous composition for dispersing or emulsifier applications in a temperature range between 210° C. and 246° C. is set out in U.S. Pat. No. 6,476,170. WO 99 23119 claims the preparation of adhesive resins in a tube reactor at a polymerization temperature between 100° C. and 300° C.—WO 2005 066216 claims the preparation of hotmelt adhesives at temperatures below 130° C. None of these specifications, however, refers to the influence of the different reaction temperatures on the microstructure of the polymers or on the performance properties that result therefrom, in a coating formulation, for example. The same is also true of the polymerization process described in WO 98 12229. This involves a variant of the tube reactor: the circulation reactor. The aim of the process claimed was to prepare polymethacrylates for the production of moldings. The process described here is limited to a relatively narrow temperature range between 135° C. and 150° C., without such restriction being substantiated in any form by an effect on the polymer microstructure.

A new generation of reactors for the continuous bulk polymerization of (meth)acrylates is represented by what are called the Taylor reactors. These reactors as well may be employed across a broad temperature range. A comprehensive description of a corresponding process for preparing binders for coatings or adhesives or sealants is given in WO 03 031056, but the microstructure of polymer chains is not addressed therein. One alternative to the continuous feeding of reaction reactors is that of reactive extrusion. WO 2007 087465 presents a process for the continuous preparation of poly(meth)acrylates for adhesive applications. Reactive extrusion has the great advantage that a high conversion can be achieved with short residence times. To date, however, no deliberate setting of the microstructure of the products has been described.

Reactive extrusion is in principle very similar to the kneading apparatus technology. WO 2006/034875 describes a process for continuous bulk polymerization, more particularly for the homopolymerization or copolymerization of thermoplastics and elastomers, above the glass transition temperature in a backmixed kneading reactor. In that process, monomers, catalysts, initiators, etc. are passed continuously into the reactor and backmixed with product which has already undergone reaction. At the same time, reacted product is removed continuously from the mixer-kneader apparatus. The process can be applied, for example, to the continuous bulk polymerization of MMA. The unreacted monomer is separated off by a residual devolatilizer and can be re-supplied to the reactor. Different polymerization temperatures and their effect on the tacticity of the product were not investigated.

WO 2007/112901 describes a method of treating viscous products, more particularly of carrying out homopolymerization or copolymerization of thermoplastics and elastomers, in which a conversion of 90%-98% is achieved. Monomer(s), catalyst(s), and/or initiator(s) and/or chain regulator(s) are supplied continuously to a backmixed mixer-kneader apparatus or to a kneading reactor and are backmixed with product which has already undergone reaction, and the reacted product is removed from the mixer-kneader apparatus. In this case the product in the kneading apparatus is heated to a boiling temperature, parts of the reactants are vaporized, and the exothermic heat from the product is absorbed by evaporative cooling. This process can be carried out without solvents or with only very small amounts of solvents. The optimum boiling temperature is set by altering the pressure. Backmixing takes place until a defined product viscosity is reached. The viscosity is maintained by continuous addition of the reactants. No investigation is described of the effect of the preparation temperature on the tacticity of the product.

Problem

The problem addressed by the present invention was that of providing improved acrylate- and/or methacrylate-based ((meth)acrylate-based for short below) binders for coating formulations.

A particular object of the present invention was to provide (meth)acrylate binders having pigment wetting properties and gloss levels that are improved in relation to the prior art. In addition, the binders are to posses a high thermal stability—for example, at temperatures of approximately 214° C. This is to be ensured by means of a particularly low fraction of head-to-head linkages in the polymer chain.

Moreover, the inventively prepared binders and hence the coating formulations prepared from them are optionally to possess improved processing properties, such as reduced melt viscosities and/or solution viscosities, for example.

A further object was to provide an environmentally compatible process which can be carried out either solvent-free or with a maximum solvent fraction of 10% by weight, and that can be carried out with high conversion or with only a very small fraction of residual monomers.

A further object arose from the imposed requirements concerning the high gloss properties of the binder, to the effect that the process can be carried out without addition of auxiliaries such as emulsifiers, stabilizers or defoamers.

Solution

The objects have been achieved by the modified deployment of specific continuous bulk polymerization processes, which allow the (meth)acrylates to be polymerized in solvent-free form and with a high conversion, and which in principle may already be regarded as state of the art. The advantage of a bulk polymerization process over suspension polymerization is the high purity of the products, which can be prepared without addition of auxiliaries such as emulsifiers, stabilizers, defoamers or other suspension auxiliaries. A further advantage is the absence of water from the product. Binders prepared by means of suspension polymerization frequently exhibit reduced gloss properties and in some cases dispersing properties as well in coating materials. This effect is attributable not only to the polymer microstructure but also to the polymer's residual moisture content, which is an inherent aspect of the process.

A further advantage of bulk polymerization over suspension polymerization is the use of any desired amounts of hydrophilic comonomers such as (meth)acrylic acids, or amino-functional or hydroxy-functional (meth)acrylates.

The advantage relative to solution polymerization is the absence or only very low fraction of volatile constituents in the polymerization process and in the primary product.

The advantage of the process of the invention over a bulk polymerization in batch mode is the significantly higher conversion that can be achieved and hence the lower fraction of residual monomers in the end product. Further factors include a higher production rate and a broader possibility for variation in the operating parameters.

A particular aspect of the solution according to the invention is the possibility of individual choice of the polymerization temperature as a function of the requirements concerning the particular product and/or particular application. The properties of the binder to be prepared, in respect of gloss, thermal stability, dispersing and wetting properties for pigments and processing properties of the binder and/or of the coating formulation are dependent, surprisingly, not only on the composition, molecular weight, molecular weight distribution, functionalities and end groups, but also in particular on the microstructure of the polymer chains. By microstructure is meant in this case the tacticity and the fraction of head-to-head linkages in the chain of the polymer. The skilled person is aware that, as a function of the monomer composition, a free-radically prepared poly(meth)acrylate is a copolymer formed of syndiotactic and atactic sections (triads), with only a small fraction of isotactic triads. Polymethacrylates with particularly high syndiotactic fractions can be prepared only by means of technically complicated processes such as an anionic polymerization at particularly low temperatures or with metal-initiated group transfer polymerization (GTP) using catalysts which have a stereoselective effect. Highly isotactic polymers, in contrast, can be realized almost only by the latter method. A third possibility for exerting stereoselective influence on a polymerization is to add a complexing agent in the form of an optically active reagent to the polymerization solution. In relation to this, see, for example, EP 1 611 162. This approach, however, has a variety of disadvantages: it can be employed efficiently only in a solution polymerization, and the auxiliary represents a further polymerization component which either must be removed, with cost and inconvenience, or else influences the optical properties of the end product.

The preparation and precise characterization of polymers with triadic purities worth more than 95% can be read out in Frauenrath et al. (Macromolecules, 2001, Vol. 34, p. 14), for example. A highly isotactic PMMA, for example, has glass transition temperatures of below 50° C. or 60° C. A highly syndiotactic PMMA, in contrast, has glass transition temperatures of well above 130° C. Changes in the thermal properties, however, are also accompanied by changes in macroscopic properties of the polymer.

As the skilled person is aware, altering the tacticity also affects the glass transition temperature, or in the rare case of a crystalline polymer, the melting temperature. Along with the thermal properties, macroscopic properties of the polymer are modified as well. The glass transition temperature can be regarded as an indicator of the chain flexibility. This flexibility also determines properties such as the melt viscosity or the solution behaviour and hence, in turn, the solution viscosity of the materials. To the skilled person it is therefore easy to see that by varying the microstructure, and especially the tacticity of a polymer chain, it is also possible to adjust aspects such as the processing properties of the polymer—for example, the capacity for formulation in a solvent, the drying rate of a coating, or the temperature and/or weather resistance of a coat film. The great influence of tacticity on the crystallinity and conformation and also on the thermal properties of polypropylene, for example, can be read about in Seymour et al. (Paintindia, 23(8), pp. 19-28, 1973).

It is also known that the minimum film thickness of a coating is very dependent on the self-organization of the polymers on the surface and on the chain flexibility. These important aspects of a coating can also be attributed to the tacticity of the polymer in question. A detailed investigation of this with PMMA coatings can be read about in Grohens et al. (Mat. Res. Soc. Symp. Vol. 629, FF1.7.1-FF1.7.7, 2001).

Surprisingly it has been found that, along with the tacticity, there are changes in the compatibility with other polymers and in the interaction with inorganic surfaces. One reason for this may be, for example, the polarity of the polymer, which changes with differences in tacticity.

A further advantage of polymers having different tacticities is therefore that the microstructure—in particular the tacticity—of a polymer, influences the interaction at interfaces. This relates on the one hand to adhesion to different substrates such as metals, ceramics or concrete. Particularly in relation to metal surfaces such as zinc or else steel, it has been possible to demonstrate significantly improved adhesion properties with the inventively prepared binders. As a function of the polymer composition, however, corresponding effects are also likely in relation to other surfaces—such as ceramic, plastic or concrete.

On the other hand, however, the dispersing of pigments or of additives present in coating materials is influenced in particular. The quality of the wetting of pigments by the binder in a coating material is critically important to the colour intensity and colour quality of the coating. The interaction of pigment and binder is determined very substantially by the position of the interacting or functional groups on a polymer chain. Thus it is conceivable, for example, that, in a syndiotactic triad, three interacting groups can be brought, with thermodynamic preference, into a spatial vicinity to one another that in the case of an isotactic unit would lead to high and adverse chain tensions. Other steric effects or interactions are likely as well. For instance, with the polymerization method of the invention, it is possible for the first time to carry out optimum preparation of a binder by means of an extremely simple and flexibly adjustable polymerization method, with respect not least to a specific combination of substrate to be coated and pigment to be dispersed in the matrix. Another aspect is the viscosity of the completed coating formulation. The skilled person is aware that when inorganic pigments, for example, are formulated in a coating material, the viscosity is greatly influenced. This effect is attributable to the interaction between binder and pigment and is an indicator of the quality of the surface wetting of the colouring additive. When inventively prepared binders are used it is found, surprisingly, that the initial viscosity of such a formulation can be lower, and hence more favourable, than that of a standard formulation with a corresponding suspension polymer. With the polymers of the invention, accordingly, it is possible for pigment dispersion to be more rapid and more efficient.

A further aspect of the quality of a coat film is the gloss. It has already been observed that the gloss is greatly influenced by the water content or solvent content of the coating matrix. Surprisingly, however, it has additionally been found that the microstructure may also bring about a large and measurable effect on the gloss values of a coat film. As a function of the polymer composition it has been possible to show that polymers having a relatively low syndiotactic fraction exhibit improved gloss values as compared with suspension polymers prepared at 80° C., which are viewed as the standard.

Hence with these processes it is possible to produce polymers in a more targeted manner as regards these macroscopic properties that are important from a performance standpoint. All of the processes known to date for stereochemical control in the polymerization of (meth)acrylates are extremely complicated and are based on the addition of further components such as specific initiators or complexing agents. A simple method of influencing the polymer tacticity during the polymerization process would therefore be of great technical interest.

To solve this problem it has been found, surprisingly, that by varying the polymerization temperature and, optionally, adapting the initiator/regulator system, it is possible to vary the tacticity of a polymer within boundaries that, although limited, are nevertheless of definite interest technically, without having to add additional components to the system, such as complexing agents, for example. It has been found, moreover, that in this respect—for reasons already elucidated—bulk polymerization is the most suitable method.

Furthermore, it is easy to conclude that this dependency of tacticity on polymerization temperature may have even greater effects, when different microstructures are compared, in monomers having alkyl radicals that are larger than methyl groups, such as in MMA. The same is also true, in particular, of copolymers formed from monomers having radicals which differ in their steric bulk.

A further advantage of the process of the invention is that it can be transposed without problems to a continuous polymerization process.

A further aspect of the present invention is the preparation of (meth)acrylate-based binders, which have a thermal stability up to 214° C., preferably up to 230° C., very preferably up to 250° C. The thermal stability at a specified temperature means a loss of mass of less than 2% by weight when a thermogravimetric analysis (TGA) is conducted. In particular, the polymerization at relatively high temperatures promotes the formation of what are called head-to-head linkages.

These bonds in the polymer chain at which, in the case of poly(meth)acrylates, two quaternary carbon atoms are linked to one another, exhibit thermal instability at temperatures above 150° C. and in the case of scission may initiate the depolymerization of a chain. This leads to reduced production yield and to an increased residual monomer content in the polymer. Furthermore, as a result of unstable bonds, such products may exhibit reduced storage stabilities and/or weather stabilities.

The formation of head-to-head linkages in poly(meth) acrylates at relatively high polymerization temperatures is not only a phenomenon which can be observed in bulk polymerization but likewise occurs in the case of solution polymers which have been prepared at a corresponding temperature.

In the present invention, the problem of head-to-head linkage and hence of the reduced thermal stability has been solved by subjecting the product to thermal aftertreatment when the polymerization is concluded. At a temperature above 120° C., preferably above 160° C., more preferably above 180° C., and internal pressure between 1 mbar and 800 mbar, preferably between 5 mbar and 400 mbar and more preferably between 10 mbar and 100 mbar, not only are volatile constituents present in the product removed, such as residual monomers or solvent used optionally, but also the head-to-head bonds are opened and the polymer chains in question are therefore stabilized or depolymerized, and the resulting low molecular mass compounds are removed. The monomers recovered in this way can even, optionally, be recycled to the polymerization process. An approach of this kind can be implemented readily in all processes described to date, such as reactive extrusion, the Taylor reactor and tube reactor, and the kneading apparatus technology, by means of an added-on process step such as a flash devolatilization or a (second) devolatilizing extruder. An alternative option is to operate one of the last implemented zones of the continuously operated reaction reactor at an appropriate temperature and, optionally, under subatmospheric pressure. This might be, for example, the last zone of an extruder or the like.

Monomers polymerized are selected from the group of (meth)acrylates such as, for example, alkyl(meth)acrylates of straight-chain, branched or cycloaliphatic alcohols having 1 to 40 C atoms, such as, for example, methyl(meth)acrylate, ethyl(meth)acrylate, n-butyl(meth)acrylate, isobutyl(meth) acrylate, tert-butyl(meth)acrylate, pentyl(meth)acrylate, 2-ethylhexyl(meth)acrylate, stearyl(meth)acrylate, lauryl (meth)acrylate, cyclohexyl(meth)acrylate, isobornyl(meth) acrylate; aryl(meth)acrylates such as for example benzyl (meth)acrylate or phenyl(meth)acrylate, which may in each case have aryl radicals which are unsubstituted or substituted 1-4 times; other aromatically substituted (meth)acrylates such as for example naphthyl(meth)acrylate; mono(meth) acrylates of ethers, polyethylene glycols, polypropylene glycols or mixtures thereof having 5-80 C atoms, such as, for example, tetrahydrofurfuryl methacrylate, methoxy(m) ethoxyethyl methacrylate, 1-butoxy-propyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate and poly(propylene glycol) methyl ether (meth)acrylate. The monomer selection may also encompass respective hydroxy-functionalized and/or amino-functionalized and/or mercapto-functionalized and/or olefinically functionalized and/or carboxyl-functionalized acrylates and/or methacrylates such as, for example, allyl methacrylate or hydroxyethyl methacrylate.

Besides the (meth)acrylates set out above, the compositions to be polymerized may also comprise further unsaturated monomers which are homopolymerizable or copolymerizable with the aforementioned (meth)acrylates. These monomers include, among others, 1-alkenes, such as 1-hexene, 1-heptene, branched alkenes such as vinylcyclohexane, 3,3-dimethyl-1-propene, 3-methyl-1-diisobutylene, 4-methyl-1-pentene, and acrylonitrile, for example, vinyl esters such as vinyl acetate, for example styrene, substituted styrenes with an alkyl substituent on the vinyl group, such as α-methylstyrene and α-ethylstyrene, for example, substituted styrenes including one or more alkyl substituents on the ring, such as vinyltoluene and p-methylstyrene, halogenated styrenes such as monochlorostyrenes, dichlorostyrenes, tribromostyrenes and tetrabromostyrenes, for example; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; maleic acid derivatives, such as maleic anhydride, maleimide, methylmaleimide, cyclohexylmaleimide, for example, and dienes such as divinylbenzene, for example, and also the respective hydroxy-functionalized and/or amino-functionalized and/or mercapto-functionalized and/or olefinically functionalized compounds. These copolymers, furthermore, may also be prepared such that they have a hydroxyl and/or amino and/or mercapto functionality and/or an olefinic functionality in a substituent. Examples of such monomers are vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, and hydrogenated vinylthiazoles and hydrogenated vinyloxazoles.

Polymerization initiators, which are added generally to the monomer phase, are the free-radical initiators typically used, more particularly peroxides and azo compounds. In certain circumstances it may be advantageous to use a mixture of different initiators. The amount used is generally situated in the range between 0.1 and 5 percent by weight, based on the monomer phase. Used with preference are azo compounds such as azobisisobutyronitrile, 1,1'-azobis(cyclohexanecarbonitrile) (WAKO® V40), 2-(carbamoylazo)isobutyronitrile (WAKO® V30) or peresters such as tert-butyl peroctoate, di(tert-butyl) peroxide (DTBP), di(tert-amyl) peroxide (DTAP), tert-butyl peroxy(2-ethylhexyl)carbonate (TB-PEHC) and further peroxides which decompose at a high temperature, as free-radical initiators. Further examples of suitable initiators are octanoyl peroxide, decanoyl peroxide, lauroyl peroxide, benzoyl peroxide, monochlorobenzoyl peroxide, dichlorobenzoyl peroxide, p-ethylbenzoyl peroxide, tert-butyl perbenzoate or azobis(2,4-dimethyl)valeronitrile.

To adjust the molecular weight of polymer formed it is also possible to add to the monomer phase, in a typical way, up to 8% by weight of one or more conventional chain regulators. Examples that may be mentioned include the following: mercaptans, such as n-butyl mercaptan, n-octyl mercaptan, n-dodecyl mercaptan, tert-dodecyl mercaptan or mercaptoethanol; thioglycolic acid or thioglycolic esters such as isooctyl thioglycolate or lauryl thioglycolate; aliphatic chlorine compounds; enol ethers or dimeric α-methylstyrene.

If branched polymers are to be prepared, the monomer phase may also contain, at up to about one percent by weight, polyfunctional monomers, examples being ethylene glycol di(meth)acrylate, butanediol di(meth)acrylate or divinylbenzene.

In order to set the viscosity at an optimum level in a continuously operated reactor it is possible optionally to add up to 10% by weight of a solvent or a plasticizer to the system. In the case of particularly high melt viscosities, an addition of this kind may be necessary in order to ensure optimum mixing of the reaction solution. It is preferred to add not more than 5% by weight to the monomer mixture. With particular preference the polymerization is carried out without addition of a solvent or plasticizer. With regard to the substances that can be added, there are no restrictions. The compounds in question may be, for example, acetates, aliphatics, aromatics or else polyethers and/or phthalates.

One preferred process for preparing the polymers of the invention is the continuously operated kneader apparatus technology. A description of a backmixed kneading reactor of this kind for continuous bulk polymerization, from the company List, is given in WO 2006/034875 and in WO 2007/112901. The polymerization is carried out above the glass transition temperature of the polymer. Monomers, catalysts, initiators, etc. are passed continuously into the reactor and are backmixed with product which has already undergone reaction. At the same time, reacted produce is removed continuously from the mixer-kneader apparatus. The unreacted monomer is separated off by means of a residual devolatilizer and can be returned to the reactor. In this residual devolatilizer, at the same time, the thermal aftertreatment of the polymer is carried out.

There is a broad field of application for the inventively prepared products. The (meth)acrylate-based bulk polymers are used preferably in coatings on surfaces, for example, of metal, plastic, ceramic or wood. One example for a coating material is the use of the polymers of the invention as binders in architectural paints, marine paints or container paints. The polymers may likewise be used in traffic markings, floor coatings, printing inks, heat-sealing lacquers, reactive hot-melt adhesives, other adhesives or sealants.

The examples given below are given for the purpose of better illustration of the present invention, but have no capacity to confine the invention to the features disclosed herein.

EXAMPLES

Determination of the Tacticity of the Polymers

The tacticity of the polymers prepared is determined by means of 1H nuclear magnetic resonance spectroscopy. The methyl signal of polymethacrylates in iso-, hetero- and syndiotactic triads shows resonance in the proton spectrum at 0.87, 1.02 and 1.21 ppm (deuterochloroform with tetramethylsilane as standard, 50° C.). Integration over these peaks gives the triad frequency.

Determination of the Metal Adhesion of Coat Films

The metal adhesion of a binder on a surface of zinc or of steel was investigated by means of the cross-cut test in accordance with DIN EN ISO 2409. The result is evaluated with values between 0 (particularly good adhesion pattern) to 5 (no adhesion). In the tables, two values are reported: the first is a visual assessment after the cutting has been carried out. The second value is for the assessment after an additional test, conforming to the standard, using an adhesive tape.

Determination of the Gloss Values

The gloss values are measured according to DIN 67630. The measurement angle is indicated in each case.

Measurement of the Dynamic Viscosity

The dynamic viscosity is measured in accordance with DIN EN ISO 53018.

Measurement of the Glass Transition Temperatures

The glass transition temperatures are measured by means of dynamic differential thermoanalysis (DSC) according to DIN EN ISO 11357-1.

Thermogravimetric Measurements

The thermogravimetric measurements take place in accordance with DIN EN ISO 11358.

Example 1

Composition 1

Continuous Bulk Polymerization

A mixture consisting of 20% by weight methyl methacrylate, 80% by weight n-butyl methacrylate, 0.4% by weight TBPEHC from Degussa Initiators and 0.4% by weight ethylhexyl thioglycolate (TGEH) is supplied continuously to a backmixed kneading reactor from List, as described for example in WO 2006/034875, and at the same time reacted polymer is taken continuously from the reactor. The internal temperature in the reactor is 140° C. The average residence time is approximately 30 minutes. Immediately after the reactor, the polymer melt is passed to a List flash devolatilizer in which, at a temperature of 180° C., residual unreacted monomers are removed from the polymer and thermally unstable head-to-head linkages are broken open. Between the reactor and the flash devolatilizer is a facility for taking a sample for TGA measurements.

Example 2

Composition 1

Like Example 1, but with 0.5% TBPEHC with an internal reactor temperature of 120° C.

Reference Example 1

Composition 1

Solution Polymerization

80% (364 g) of n-butyl methacrylate and 20% (91 g) methyl methacrylate are mixed to form a monomer stock solution. 91 g of the monomer stock solution and 140 g of n-butyl acetate are charged to a 2 l jacketed reactor with blade stirrer, reflux condenser and nitrogen blanketing. 0.3 g of TGEH is dissolved in 5 g of n-butyl acetate and the solution is introduced into the reactor. The mixture is heated to an internal temperature of 60° C. with stirring. 0.55 g of Peroxan PND from Pergan GmbH, in solution in 5 g of n-butyl acetate was added. Following the exothermic reaction, the remaining monomer stock solution is metered in together with 1.2 g of TGEH and 2.2 g of Peroxan PND over the course of 3 hours at an internal temperature of 60° C. After the end of the metering, initiation is repeated with 1.4 g of Peroxan PND in 100 g of n-butyl acetate. The subsequent reaction time is three hours. The batch is then cooled to approximately 40° C. and diluted with 240 g of n-butyl acetate in the process.

Reference Example 2

Composition 1

Like reference Example 1, only with a total amount of 2.73 g of Peroxan PO from Pergan GmbH as initiator and with an internal temperature of 90° C.

Reference Example 3

Composition 1

Like reference Example 1, only with a total amount of 1.83 g of TBPB from Degussa Initiators as initiator, a total amount of 0.91 g of TGEH as regulator, and an internal temperature of 120° C.

Reference Example 4

Composition 1

Bulk Polymerization 720 g of n-butyl methacrylate, 180 g of methyl methacrylate, 3.6 g of TGEH and 3.6 g of TBPEHC are mixed in a glass beaker and homogenized with stirring for 30 minutes. The mixture is introduced into a mould consisting of two glass plates (20*20 cm) and a plastic strip 6 mm thick. The strip is mounted between the two glass plates in such a way that it ensures not only a constant distance between the plates but also the sealing of the mould. The mould is held together by clamps. After filling, the mould is placed in an oven at 80° C. for 3 hours. The mould is then removed from the oven, allowed to cool to room temperature and opened to allow the polymer plate to be removed.

Reference Example 5

Composition 1

Like Reference Example 4, but with 2.3 g of TGEH, 4.7 g of Peroxan LP from Pergan GmbH and with an oven temperature of 120° C.

Reference Example 6

Composition 1

Suspension Polymerization

A 5 L polymerization vessel with heating/cooling jacket, equipped with stirrer and reflux condenser, is charged with 3200 ml of fully demineralized water, the stirrer is set to a speed of 300 revolutions per minute, and the reactor is heated to an external temperature of 40° C. 200 g of a 13% strength aqueous solution of polyacrylic acid and 0.5 g of potassium hydrogen sulphate are added and dispersed by stirring. In a glass beaker, 1280 g (80%) of n-butyl methacrylate, 320 g (20%) of methyl methacrylate, 7.5 g of Peroxan LP and 4 g of TGEH are mixed and homogenized with stirring. The monomer stock solution is pumped into the reactor. The internal temperature is regulated at 85° C. The polymerization is over when heat stops being given off. The batch is cooled. Using a suction filter, the mother liquor is separated from the polymer beads which are washed thoroughly with fully demineralized water and dried in a drying oven at 85° C.

|  | Preparation temperature [° C.] | Fraction of syndiotactic triads [%] | Fraction of heterotactic triads [%] | Fraction of isotactic triads [%] |
| --- | --- | --- | --- | --- |
| Reference Example 1 | 60 | 67 | 31 | 2 |
| Reference Example 4 | 80 | 64 | 34 | 1 |
| Reference Example 6 | 85 | 62 | 35 | 3 |
| Reference Example 2 | 90 | 62 | 36 | 2 |
| Reference Example 5 | 120 | 59 | 38 | 3 |
| Reference Example 3 | 120 | 59 | 38 | 3 |
| Example 1 | 140 | 57 | 39 | 5 |
| Example 2 | 120 | 59 | 37 | 4 |

From Example 2 (inventive preparation) and also the Reference Examples 3 (solution polymerization) and 5 (batch process in bulk) it is possible to show that the polymer tacticity is dependent exclusively on the polymerization temperature and not on other factors of the particular polymerization process.

As already elucidated, the products of a bulk polymerization in batch mode and the products of a continuous bulk polymerization process are very comparable with one another. From Examples 1, 2 and 3 and also from Reference Examples 5, 6 and 7 it is possible to show that the process of the invention can be used within a very broad temperature range—and hence for preparing polymers having very different tacticities.

Example 3

Composition 2

Like Example 1, but the mixture supplied to the reactor consists of 65% n-butyl methacrylate, 34% methyl methacrylate, 1% methacrylic acid, 0.5% TBPEHC and 0.3% thioglycolic acid from Dr. Spiess Chemische Fabrik GmbH.

Reference Example 7

Composition 2

Like Reference Example 4, but with 585 g of n-butyl methacrylate, 306 g of methyl methacrylate and 9 g of methacrylic acid as monomers, 2.5 g of Peroxan PND and 3 g of thioglycolic acid, and at 38° C.

Reference Example 8

Composition 2

Like Reference Example 6, but with 510 g of methyl methacrylate, 975 g of n-butyl methacrylate, 15 g of methacrylic acid, 7.5 g of Peroxan LP and 12 g of lauryl mercaptan from Dr. Spiess Chemische Fabrik GmbH.

Preparation of Pigmented Paints with Binder/Pigment Ratio of 1:0.5

A 40% strength binder solution in Solvesso 100 solvent is premixed by hand together with titanium dioxide (1 to 0.5 pigmentation) as a pigment. Steatite beads are incorporated into this mixture and the vessel is closed and agitated on a roller bed for 24 hours. After the end of the dispersing operation, the paint is poured off via a sieve and a measurement made of the dynamic viscosity of the filtrate. The gloss is determined on a dried knife drawdown with a thickness of 200 µm. The adhesion to various substrates is investigated by means of cross-cut tests in accordance with the standard.

|  | Fraction of syndiotactic triads [%] | Gloss units, pigmented films (20°) | Adhesion cross-cut steel | Adhesion cross-cut zinc | Dynamic viscosity [mPas] |
| --- | --- | --- | --- | --- | --- |
| Reference Example 7 | 63 | 59.1 | 0-1/0 | 1/2-3 | 274 |

-continued

|  | Fraction of syndiotactic triads [%] | Gloss units, pigmented films (20°) | Adhesion cross-cut steel | Adhesion cross-cut zinc | Dynamic viscosity [mPas] |
|---|---|---|---|---|---|
| Reference Example 8 | 60 | 58.1 | 3-4/3 | 5/5 | 246 |
| Example 3 | 50 | 68.2 | 1/1 | 1/2 | 210 |

In comparison to a binder prepared by means of suspension polymerization (Reference Example 8), a formulation with a polymer prepared inventively and at high temperature (140° C.) (Example 3) with the same composition exhibits significantly superior gloss values and improved metal adhesion—particularly with regard to the zinc substrates, which are very important industrially. With reference to the gloss values, the effect—as is also apparent from a comparison with a bulk polymer prepared at very low temperatures (Reference Example 7)—can be attributed in particular to the tacticity of the polymer. The even slightly poorer gloss value of the suspension polymer (Reference Example 7) even in relation to the harder (i.e. higher syndiotactic fraction) bulk polymer (Reference Example 8), shows that residual water and the adjuvants needed in the suspension polymerization make an additional contribution to a reduction in gloss.

With regard to the metal adhesion, the effect is a combination of different tacticities (see, in particular, comparison of zinc adhesion with Reference Example 7) and the auxiliaries present in suspension polymers (see, in particular the lack of adhesion to zinc surfaces of the formulation prepared with comparative specimen 8).

Furthermore, in accordance with expectations, the formulations comprising inventively prepared binder from Example 2 exhibit the lowest dynamic viscosity and hence the best processing properties.

In order to be able to compare the weathering stability of the individual coating formulations with one another, specimens coated in accordance with the respective measurement standard were subjected to weathering as follows: in successive cycles, the samples were irradiated with UV light at 20° C. for eight hours and then treated with condensation at 60° C. for four hours. Coating takes place in accordance with the procedure described, without addition of titanium dioxide.

|  | Gloss units pigmented films (60°) | Adhesion cross-cut steel | Adhesion cross-cut zinc |
|---|---|---|---|
| Reference Example 7 | 71.1 | 0/0 | 1/1 |
| after 500 h | 69.1 | 0/0 | 1/1 |
| after 2000 h | 63.7 | 1/1 | 1-2/2 |
| Reference Example 8 | 70.2 | 2/5 | 1/3-4 |
| after 500 h | 67.5 | 2/3-4 | 2/4 |
| after 2000 h | 60.1 | 2/3-4 | 2/4 |
| Example 3 | 77.6 | 0/0 | 1/2 |
| after 500 h | 71.5 | 0/0 | 1/2 |
| after 2000 h | 66.0 | 0-1/0-1 | 0-1/1 |

The comparison of the loss of gloss and the adhesion values in respect of metal adhesions show that the different binders have comparable weathering stabilities.

|  | Fraction of syndiotactic triads [%] | $T_g$ | Weight loss up to 214° C. | Weight loss up to 420° C. |
|---|---|---|---|---|
| Reference Example 7 | 63 | 64.8° C. | 0.2% | 99.2% |
| Reference Example 8 | 60 | 63.2° C. | 0.3% | 98.2% |
| Example 3 before devolatilization | n.d. | n.d. | 6.5% | 98.5% |
| after devolatilization | 50 | 57.5° C. | 0.3% | 99.4% |

The dependency of the glass transition temperatures $T_g$ on the respective tacticity can be shown by means of DSC measurements. A comparison in particular of the polymers from Example 3 and from Reference Example 8 shows, with an identical polymer composition, a difference in glass transition temperatures of more than 5° C. This difference is attributable exclusively to the tacticity—and hence the polymerization temperature.

Thermogravimetric measurements (TGA measurements) on the inventively prepared material from Example 3—in each case before and after the devolatilization step—show a distinct improvement in the thermal stability of the polymer. Up to a temperature of 214° C., the thermally aftertreated samples exhibit a thermal stability which is comparable to that of suspension polymers (Reference Example 8) and bulk polymers prepared in a batch process (Reference Example 7).

In accordance with the invention, then, it is possible to prepare binders which in spite of a significantly higher reaction temperature have a thermal stability and weathering stability that are comparable to polymers prepared by means of established preparation processes. These qualities can be attributed to a comparably low fraction of head-to-head linkages in the polymer.

The invention claimed is:

1. A process for preparing a (meth)acrylate-based binder, the process comprising:
    continuous bulk polymerizing a monomer present in a mixture composed exclusively of said monomer, an initiator, optionally, a chain transfer reagent, and not more than 10% by weight of a solvent in a kneading apparatus to obtain a polymer; and
    thermally treating said polymer obtained from said continuous bulk polymerizing at a temperature of more than 160° C. in a device downstream from said kneading apparatus, thereby obtaining a binder having a thermal stability of up to 214° C.,
    wherein
    said continuous bulk polymerizing is carried out in said kneading apparatus at a temperature of from 20 to 250° C.,
    said binder is a polymer having a tacticity obtained by said continuous bulk polymerizing carried out at said temperature.

2. The process for preparing a binder according to claim 1, wherein
said continuous bulk polymerizing is carried out at a temperature of from 100 to 250° C.; and
said monomer is exclusively methacrylic acid, an ester of methacrylic acid, or a combination thereof.

3. The process for preparing a binder according to claim 1, wherein said thermally treating is carried out at a temperature of more than 180° C.

4. The process for preparing a binder according to claim 1, wherein said thermally treating is carried out at a temperature of more than 160° C. and at an internal pressure of from 1 to 800 mbar.

5. The process for preparing a binder according to claim 1, wherein said thermally treating is carried out at a temperature of more than 160° C. and at an internal pressure of from 5 to 400 mbar.

6. The process for preparing a binder according to claim 1, wherein said thermally treating is carried out at a temperature of more than 160° C. and at an internal pressure of from 10 to 100 mbar.

7. The process for preparing a binder according to claim 1, wherein said thermally treating is carried out at a temperature of more than 180° C. and at an internal pressure of from 1 to 800 mbar.

8. The process for preparing a binder according to claim 1, wherein said thermally treating is carried out at a temperature of more than 180° C. and at an internal pressure of from 5 to 400 mbar.

9. The process for preparing a binder according to claim 1, wherein said thermally treating is carried out at a temperature of more than 180° C. and at an internal pressure of from 10 to 100 mbar.

10. The process for preparing a binder according to claim 1, wherein said initiator is present in said monomer mixture in an amount of from 0.1 to 5% by weight relative to the total weight of the monomer mixture.

11. The process for preparing a binder according to claim 1, wherein said initiator is selected from the group consisting of azobisisobutyronitrile; 1,1'-azobis(cyclohexanecarbonitrile); 2-(carbamoylazo)isobutyronitrile; tert-butyl peroctoate; di(tert-butyl)peroxide; di(tert-amyl)peroxide; tert-butyl peroxy(2-ethylhexyl)carbonate; octanoyl peroxide; decanoyl peroxide; lauroyl peroxide; benzoyl peroxide; monochlorobenzoyl peroxide; dichlorobenzoyl peroxide; p-ethylbenzoyl peroxide; tert-butyl perbenzoate; azobis(2,4-dimethyl) valeronitrile; and a combination thereof.

12. The process for preparing a binder according to claim 1, wherein said initiator is present in said monomer mixture in an amount of from 0.1 to 5% by weight relative to the total weight of the monomer and is selected from the group consisting of azobisisobutyronitrile; 1,1'-azobis(cyclohexanecarbonitrile); 2-(carbamoylazo)isobutyronitrile; tert-butyl peroctoate; di(tert-butyl)peroxide; di(tert-amyl)peroxide; tert-butyl peroxy(2-ethylhexyl)carbonate; octanoyl peroxide; decanoyl peroxide; lauroyl peroxide; benzoyl peroxide; monochlorobenzoyl peroxide; dichlorobenzoyl peroxide; p-ethylbenzoyl peroxide; tert-butyl perbenzoate; azobis(2,4-dimethyl)valeronitrile; and a combination thereof.

13. The process for preparing a binder according to claim 1, wherein said chain transfer reagent is present in said monomer mixture and is selected from the group consisting of n-butyl mercaptan; n-octyl mercaptan; n-dodecyl mercaptan; tert-dodecyl mercaptan; mercaptoethanol; thioglycolic acid; isooctyl thioglycolate; lauryl thioglycolate; an aliphatic chlorine compound; an enol ether; dimeric α-methylstyrene; and a combination thereof.

14. The process for preparing a binder according to claim 1, wherein said chain transfer reagent is present in said monomer mixture in an amount of up to 8% by weight relative to the total weight of said monomer and is selected from the group consisting of n-butyl mercaptan; n-octyl mercaptan; n-dodecyl mercaptan; tert-dodecyl mercaptan; mercaptoethanol; thioglycolic acid; isooctyl thioglycolate; lauryl thioglycolate; an aliphatic chlorine compound; an enol ether; dimeric α-methylstyrene; and a combination thereof.

15. The process for preparing a binder according to claim 1, wherein said monomer consists of at least one of methyl (meth)acrylate; ethyl (meth)acrylate; n-butyl (meth)acrylate; isobutyl(meth)acrylate; tert-butyl (meth)acrylate; pentyl (meth)acrylate; 2-ethylhexyl(meth)acrylate; stearyl(meth) acrylate; lauryl(meth)acrylate; cyclohexyl(meth)acrylate; isobornyl(meth)acrylate; benzyl (meth)acrylate; phenyl (meth)acrylate; naphthyl(meth)acrylate; a mono(meth)acrylate of an ether; a polyethylene glycol; a polypropylene glycol; and a mixture of at least two of tetrahydrofurfuryl methacrylate, methoxy(m)ethoxyethyl methacrylate, 1-butoxy-propyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly (propylene glycol) methyl ether(meth)acrylate.

16. The process for preparing a binder according to claim 1, wherein said monomer consists of at least one of 1-hexene; 1-heptene; vinylcyclohexane; 3,3-dimethyl-1-propene; 3-methyl-1-diisobutylene; 4-methyl-1-pentene; acrylonitrile; styrene; α-methylstyrene; α-ethylstyrene; vinyltoluene; p-methylstyrene; monochlorostyrene; a dichlorostyrene; a tribromostyrene; a tetrabromostyrene; 2-vinylpyridine; 3-vinylpyridine; 2-methyl-5-vinylpyridine; 3-ethyl-4-vinylpyridine; 2,3-dimethyl-5-vinylpyridine; vinylpyrimidine; 9-vinylcarbazole; 3-vinylcarbazole; 4-vinylcarbazole; 2-methyl-1-vinylimidazole; vinyloxolane; vinylfuran; vinylthiophene; vinylthiolane; a vinylthiazole; a vinyloxazole; anisoprenyl ether; maleic anhydride; maleimide; methylmaleimide; cyclohexylmaleimide; divinylbenzene; vinylpiperidine; 1-vinylimidazole; N-vinylpyrrolidone; 2-vinylpyrrolidone; N-vinylpyrrolidine; 3-vinylpyrrolidine; N-vinylcaprolactam; N-vinylbutyrolactam; a hydrogenated vinylthiazole; a hydrogenated vinyloxazole; methyl (meth)acrylate; ethyl (meth) acrylate; n-butyl (meth)acrylate; isobutyl(meth)acrylate; tert-butyl (meth)acrylate; pentyl(meth)acrylate; 2-ethylhexyl (meth)acrylate; stearyl(meth)acrylate; lauryl(meth)acrylate; cyclohexyl(meth)acrylate; isobornyl(meth)acrylate; benzyl (meth)acrylate; phenyl(meth)acrylate; naphthyl(meth)acrylate; a mono(meth)acrylate of an ether; a polyethylene glycol; a polypropylene glycol; and a mixture of at least two of tetrahydrofurfuryl methacrylate, methoxy(m)ethoxyethyl methacrylate, 1-butoxy-propyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly(propylene glycol) methyl ether (meth)acrylate.

17. The process for preparing a binder according to claim 1, wherein said monomer is a combination of methyl methacrylate and n-butyl methacrylate, said initiator is tert-butyl peroxy(2-ethylhexyl)carbonate, and said chain transfer reagent is present and is ethylhexylthioglycolate.

* * * * *